(12) United States Patent
Asrani et al.

(10) Patent No.: US 9,241,050 B1
(45) Date of Patent: Jan. 19, 2016

(54) SELF-HEALING ANTENNA SYSTEM

(71) Applicant: GOOGLE TECHNOLOGY HOLDINGS LLC, Mountain View, CA (US)

(72) Inventors: Vijay L. Asrani, Round Lake, IL (US); Krishna Katragadda, Mundelein, IL (US); Peruvemba Ranganathan Sai Ananthanarayanan, Naperville, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/488,709

(22) Filed: Sep. 17, 2014

Related U.S. Application Data

(60) Provisional application No. 62/046,211, filed on Sep. 5, 2014.

(51) Int. Cl.
*H04M 1/02* (2006.01)
*H04B 1/3827* (2015.01)
*H04W 88/02* (2009.01)

(52) U.S. Cl.
CPC ............ *H04M 1/026* (2013.01); *H04B 1/3833* (2013.01); *H04W 88/02* (2013.01)

(58) Field of Classification Search
CPC ...................................................... H04B 1/0458
USPC .................................... 455/73, 77, 87, 550.1
See application file for complete search history.

(56) References Cited

U.S. PATENT DOCUMENTS

| | | | |
|---|---|---|---|
| 6,594,508 B1 * | 7/2003 | Ketonen ........................ | 455/561 |
| 8,761,296 B2 * | 6/2014 | Zhang et al. .................. | 375/267 |
| 2013/0322562 A1 | 12/2013 | Zhang et al. | |

* cited by examiner

*Primary Examiner* — Tuan H Nguyen
(74) *Attorney, Agent, or Firm* — Wolfe-SBMC

(57) ABSTRACT

A mobile communication device is provided that uses an accelerometer to sense when the mobile communication device is dropped and impacts a hard surface, such as a floor or table, with a force hard enough to bend or deform an external metal antenna. Once such an impact is detected by the mobile communication device, the mobile communication device is further configured to determine whether an antenna has become detuned from its respective transceiver and then retune the antenna prior to the user picking up the dropped mobile communication device.

15 Claims, 5 Drawing Sheets

SELF-HEALING ANTENNA SYSTEM

TECHNICAL FIELD

The technology herein generally relates to wireless communications and antenna tuning and, more particularly to antenna tuning and retuning after antenna damage.

BACKGROUND

Portable communication devices, such as mobile phones, personal digital assistants (PDAs) and tablets have become extremely popular and for many users are now considered indispensable.

One of the most important components of portable communication devices (hereinafter referred to as "UE"s) are their antennas, which are configured to radiate and receive electromagnetic waves so as to transmit and exchange wireless information signals between the UE and other locations. Such antennas must be designed to work with multiple frequency bands such as those used in present day wireless communication networks. Wireless communication device users continue to demand increasingly thinner, lighter and miniaturized devices. Such demands place additional physical limitations on the antennas used in portable wireless communication devices. As a result, multi-band antenna design for mobile communication devices continues to become more complex.

The housings of portable communication devices or user equipment (UE) may accommodate one or more antennas that support wireless communications. A UE may use long-range wireless communication systems such as cellular telephone systems, to send and receive communications. Such cellular or other long-range wireless communication systems may include, the Global System for Mobile Communications (GSM) telephone bands, Enhanced Data rates for GSM Evolution (EDGE); General Packet Radio System (GPRS); CDMA, such as IS-95; CDMA2000; WCDMA or Universal Mobile Telecommunications System (UMTS); Fourth Generation Long Term Evolution (LTE); other wide area network communication systems; PrivateMobile Radio (PMR); Worldwide Interoperability for Microwave Access (WIMAX); WLAN; other 3G or 4G networks; or the like. UEs may also use short-range wireless communication protocols to support communications with nearby devices. Such short rang protocols may include Wi-Fi (IEEE 802.11) and Bluetooth protocols.

The positioning and placement of antennas in UEs having smaller and thinner housings present additional design challenges. Handheld communication devices have largely abandoned antenna designs that have an antenna projecting outward from the housing. Mobile communication device housings are now routinely designed with internal antenna elements. However, when antennas are positioned within or and along an edge of the device housing, the presence of a user's hand can degrade antenna performance. Regardless, antennas are routinely located along an inner edge of the device housing despite the increased likelihood of these detrimental effects.

Additionally, when an antenna is included as part of an exterior surface of a UE chassis, such as a metal band about the edge of the UE chassis, dropping the UE may result in damaging, bending, deforming or generally moving aspect of the antenna from its previous location to another location. Since these antennas are impedance tuned or matched with a transceiver of the UE in order to help maximize transmission power and reception of radio signals, a damaged, bent, deformed or antenna that is moved relative to other metal elements of the UE may result in a change impedance and/or capacitance of the antenna relative to the transceiver circuit that it has been matched or tuned to. As such, what is needed is a method and circuitry adapted to correct or rematch the impedance of a deformed metal band antenna with the transceiver related circuitry of the UE.

BRIEF DESCRIPTION OF THE DRAWINGS

For a more complete understanding, reference is now made to the following description taken in conjunction with the accompanying Drawings in which.

DETAILED DESCRIPTION

Figure 1A:
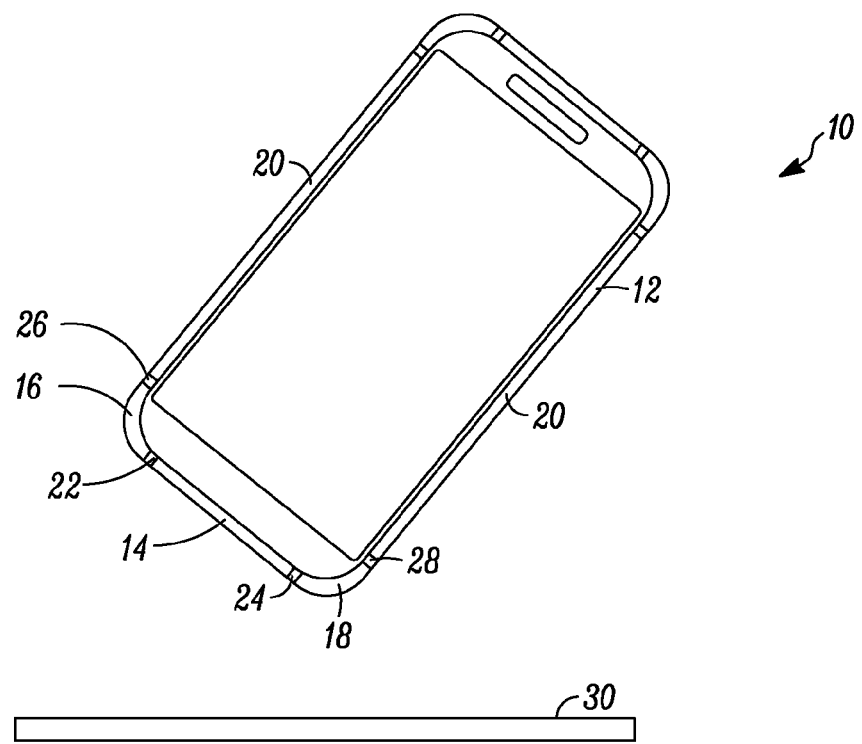
FIGS. 1A and 1B provide a drawing of a mobile device that is falling and impacting a hard object or surface, respectively.

Referring now to the drawings, wherein like reference numbers are used herein to designate like elements throughout, the various views and embodiments of the self-healing antenna system are illustrated and described, and other possible embodiments are described. The figures are not necessarily drawn to scale, and the drawings may have been exaggerated and/or simplified in places for illustrative purposes only. One of ordinary skill in the art will appreciate the many possible applications and variations based on the following examples of possible embodiments. The following detailed description is therefore not to be taken in a limiting sense and the scope of the present disclosure is defined by the appended claims and equivalents thereof.

Within the descriptions of the various figures, similar elements may be provided similar names and reference numerals as to those of previous figures. The specific numerals assigned to the elements are provided solely to aid in the description and are not meant to imply any limitations (structural, functional or otherwise) on the described element.

It is understood that the use of specific component, device and/or parameter names, such as those of executing utility, logic, or firmware described herein are for example only and not meant to imply any limitations on the described embodiments. The embodiments may thus be described with different nomenclature or terminology or acronyms utilized to describe the components, devices and parameters herein, without limitation references to any specific protocol or proprietary name in describing one or more elements, features or concepts of the embodiments are provided solely as examples of one implementation, and such references do not limit the extension of the claimed embodiments to embodiments in which a different element, feature or concept name may be utilized. Thus, each term utilized herein is to be given its broadest interpretation based on the context in which that term is utilized.

As further described below, implementation of the functional features of the disclosure described are provided within processing devices/structures and can involve use of a combination of hardware, firmware, as well as several software-level constructs (e.g., program code) that are executed by a processing device to provide a specific utility for the device presented. Figures illustrate both hardware components and software/logic components within embodiments of a communication device architecture.

The illustrated embodiments provide a method and communication device that implements an antenna and capacitive sensing system associated with a slotted metal bezel about a periphery of the front and/or backside of a mobile communication device also known as user equipment (UE). The bezel or band may be a slotted metal band or a metal band having a plurality of metal segments or sections separated by small gaps. The small gaps are configured to have a width, between metal segments, that is large enough so that the metal segments on either side of each gap do not contact each other. The small gaps may have a width that separates the two adjacent metal segments by about 0.1 mm to about 1 cm. Various ones of the metal segments are configured to operate as an integrated antenna, while other segments operate as parasitic capacitive elements and ground elements that may be used in conjunction with the antenna to provide antenna impedance measurements to aide adjustment of the antenna impedance. The bezel may include cosmetic features that enhance the look of the mobile communication device.

Embodiments of the self-healing system and method take a minimal amount of space with the UE. Embodiments can sense that the UE may have been dropped by sensing a rapid change in acceleration due the UE striking another surface and indicating a high force impact. After impact, the UE can compare a newly measured single ended capacitance between an antenna metal segment and an adjacent metal segment on the slotted metal bezel with a previously measured single ended capacitance between the same two metal segments to determine whether there has been a change in capacitance.

In another embodiment, after sensing that the UE may have experienced a high force impact due to a rapid change in an accelerometer circuit's output, the UE can compare a newly measured and/or calculated differential capacitances from each of the metal segments that are adjacent to and on either side of the antenna metal segment to previously measured, calculated and stored differential capacitance of the same adjacent metal segments in order to determine whether the differential capacitance of the adjacent metal segments has changed. If no significant change in one or more of the differential capacitances is found, then it can be assumed that no antenna damage, position movement relative to other metal parts of the UE, or shape change has occurred.

Alternatively, when a change in at least one of the differential capacitance is determined, then it can be assumed that the associated antenna section of the metal band or one of the adjacent metal segments has been bent, dinged, moved, or altered in a manner that alters the antenna impedance as seen by the UE's transceiver and that an antenna deformation has occurred. In some embodiments, the differential capacitance is measured over a predetermined time period or a plurality of time during a predetermined time period to determine whether the change in the measured differential capacitance (the newly measured capacitance) is constant for the predetermined amount of time so that the UE can better determine that an antenna deformation has occurred. When it is determined that an antenna deformation has occurred, the UE can then adjust the settings of an antenna matching circuit to retune the antenna's impedance as seen by the UE's transceiver circuit to an impedance that more closely matches the transceiver for a selected transmit or receive frequency. As such, embodiments are configured to self-heal or self-adjust to an antenna deformation due to a UE being, for example, dropped by the user.

In various embodiments the newly measured differential capacitance measurements, taken after the sensed rapid change in acceleration provided by the accelerometer circuit, are used by processor to calculate the setting change or the impedance adjustment of the antenna matching circuit. In other embodiments, the processor may use the newly measured differential capacitance measurements to lookup in a table stored in the UE's memory to determine new impedance settings to provide the antenna matching circuit so that the impedance between the antenna and transceiver is retuned to be closely impedance matched.

Figure 1B:
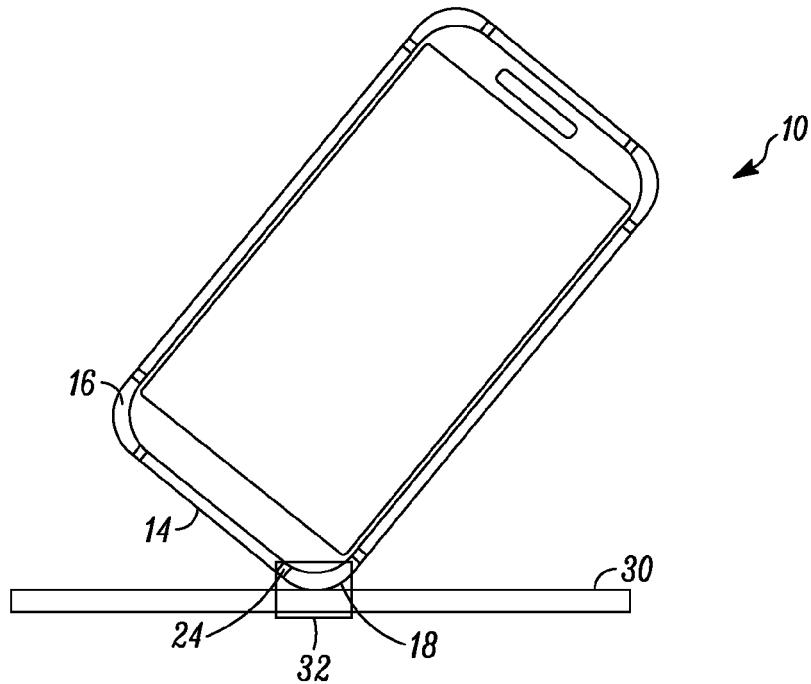

FIGS. 1A and 1B depict a mobile terminal or UE 10 that has a sectioned metal band 12 about a perimeter edge of the UE 10. The sectioned metal band 12 has at least one antenna section 14. There are two metal sections, a first metal section 16 and a second metal section 18, which are adjacent to and respectively spaced from both ends of the antenna section 14. In this embodiment, the first and second metal section 16 and 18 are also first and second corner metal corner sections 16 and 18. In other embodiments, the first and second metal sections may be metal corner sections of the metal band as the band extends about a periphery or perimeter edge of the UE 10. The first and second metal sections 16 and 18 may perform a variety of functions. For example, the first and second metal sections may be provided to reduce capacitive coupling between the antenna section 14 and the side metal sections 20, which may be grounded or be configured to also be antennas, by providing additional distance between the antenna 14 and a grounded section 20. The reduction in coupling (i.e., decoupling) between the antenna 14 and a grounded section or side section 20 improves the antenna's efficiency. In some embodiments, the first and second metal sections 16 and 18 may be referred to as parasitic sections, electrically floating sections and/or floating sections.

In various embodiments, the sectioned metal band 12 comprises insulative or high impedance gaps between the various metal sections of the sectioned metal band 12. For example, the antenna 14 is defined between a first gap 22 and a second gap 24. The first corner section 16 is adjacent to and separated from a first side of the antenna 14 by the first gap 22. The second corner section 18 is adjacent to and separated from a second side of the antenna 14 by the second gap 24.

In some embodiments, additional insulative gaps 26 and 28 may exist between the first and second metal sections 16 and 18 and their respective adjacent side sections 20. Various embodiments may have a plurality of metal sections on the sectioned metal band 12, wherein each metal section is defined and separated from each of the other metal sections by gaps. In other words, each on of the plurality of conductive metal sections is interposed between two gaps, which define the ends of each conductive section in the slotted or sectioned metal band 12. The gaps may be made of an insulative polymer, ceramic, plastic, epoxy, rubber, glass or other substantively equivalent non-conductive, insulative material.

Still referring to FIGS. 1A and 1B, FIG. 1A depicts a UE 10 that is falling toward a hard surface 30, such as a floor, sidewalk, table top, parking lot surface, rocky surface, etc. In various embodiments, the UE 10 includes an accelerometer circuit or sensor (see, e.g., FIGS. 3 and 4). An accelerometer is a device that measures proper acceleration ("g-force"). Accelerometers are commonly used in UE devices such as tablet computers, digital cameras, mobile communication devices, and personal digital assistants to indicate when images on display screens should be rotated such that they are displayed upright to the user. Single and multi-axis accelerometers may be used in various embodiments detect the magnitude and direction of the proper acceleration or g-force as a vector quantity. As such, an accelerometer included in an exemplary UE 10 is able to detect that the UE 10 may have been dropped due to a first sudden acceleration.

Referring now to FIG. 1B, the UE 10 is shown impacting or colliding with the hard surface 30. The impact area 32 is shown within a rectangular box. This example, the second corner 18 is striking or colliding with the hard surface 30. When the second corner 18 strikes a hard surface 30 with enough impact, the second corner 18 may be damaged, bent, deformed, or moved relevant to the antenna 14. In other examples, not specifically shown, the antenna 14 could have been damaged, bent, deformed, or moved relevant to one of the first or second metal sections 16 and 18. Hereinafter, a metal section being damaged, bent, deformed or moved relevant to another metal section may be referred to as being "deformed". When the antenna 14 or either one of the first and second metal sections 16 and 18 are deformed, the impedance seen by the transceiver that is connected to the antenna will change. Such a change in the impedance will affect the efficiency of the transceiver's ability to transmit and receive wireless communications via the antenna 14. That is after an antenna deformation, the metal band antenna will be subjected to a change in performance that may cause efficiency degradation due to a detuning of the antenna impedance with the transceiver.

Upon impact with the hard surface 30, the accelerometer (not specifically shown in this figure) will detect a second sudden acceleration (in this case a deceleration) that is greater than the first acceleration sensed when the UE 10 was first released or dropped and began to fall.

Figure 2:
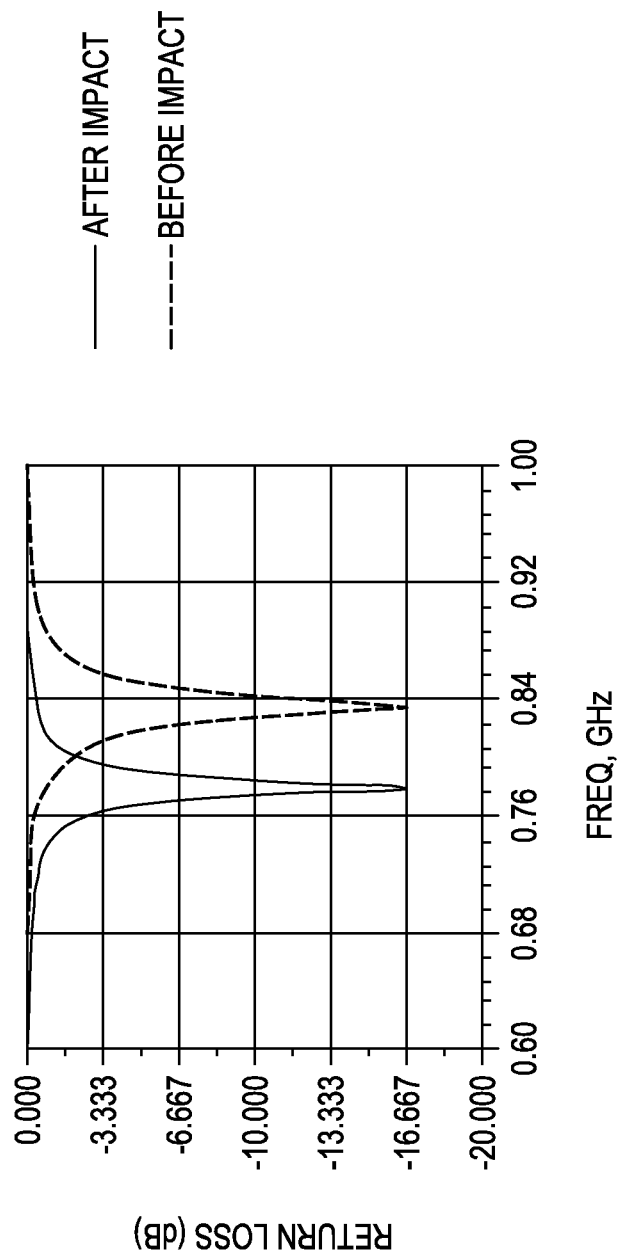
FIG. 2 provides a graph of antenna tuning before and after impact with a hard object.

For mobile UE communication devices, optimal antenna performance requires tuning the antenna based on the frequency band that the transceiver is transmitting or receiving. Referring now to FIG. 2, when a user drops a mobile device on the floor and the metal band is deformed, the antenna performance is affected because the antenna can become detuned out of the frequency band in which the transceiver is transmitting or receiving. Here in FIG. 2 is a graph indicating that prior to dropping a UE, the antenna is tuned (i.e., impedance matched with the transceiver) for an 850 MHz transmit band. After the user dropped the mobile device and deformation of a metal band section occurred, the antenna was tuned for 770 Mhz. When the user picks up the mobile device off the floor, if no impedance correction is applied to the antenna matching circuit, the antenna's frequency response is outside the selected band and thus there is degradation of the antenna's efficiency.

Figure 3:
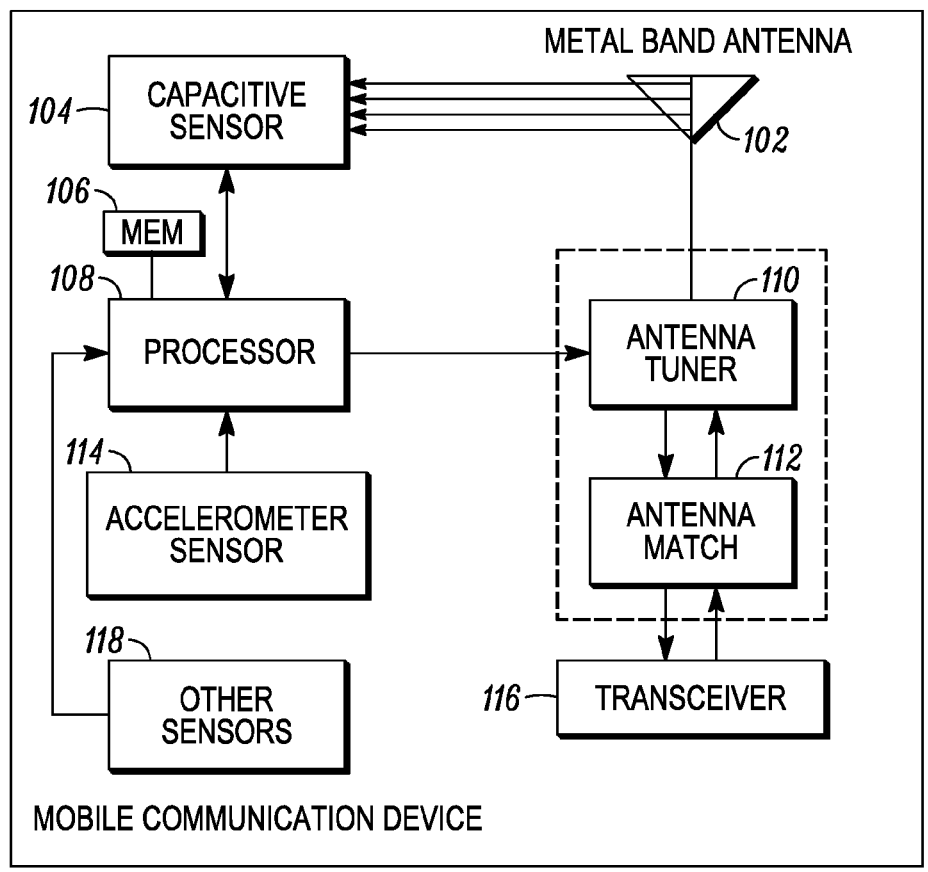
FIG. 3 is a block diagram of an embodiment.

FIG. 3 depicts a block diagram of a mobile communication device embodiment 100. The metal band antenna sections and adjacent metal sections 102 (for example, FIG. 1 elements 14, 16 and 18) are each connected to a capacitive sensor network or block. The capacitive sensor block 104 measures a differential capacitance between the metal band antenna section and its adjacent metal sections. An initial differential capacitance condition of an un-deformed metal band section is sensed and established by calibrating the differential capacitance between adjacent metal segments in free space during production of the UE mobile communication device 100. The initial calibrated differential capacitance is stored in a memory circuit or other memory device by a processor 108. In various embodiments, a matching impedance look-up table is stored in the memory 106 that provides impedance adjustments to be applied to an antenna tuner circuit 110 for a plurality of transmit and receive bands. Additionally, a corrective impedance look-up table may also be stored in the memory 106 that provides an impedance adjustment for an antenna matching circuit 112 based on a change in the differential capacitance between the metal band antenna and its adjacent metal sections. In some embodiments, the antenna tuner 110 and antenna matching circuit 112 may be combined as a single circuit or block within the UE 100.

In various embodiments, an accelerometer sensor 114 is monitored by the processor 108 for abrupt changes in acceleration indicating that the UE has been dropped and/or the UE has sustained a high force impact a solid surface or object. In some embodiments, the processor 108 monitors for both a first acceleration indicating that the UE was dropped and a second acceleration that exceeds a predetermined threshold acceleration indicating that the UE impacted a hard surface. In other embodiments, the processor is monitoring for the second acceleration that is exceeds the predetermined threshold acceleration indicating that the UE impacted a hard surface. Sensing of both the first acceleration and the second acceleration provides a better indication that the UE has been subjected to a drop an impact. Additionally in some embodiments when the UE senses the first acceleration indicating that the UE has been dropped by the user, the processor may immediately take a pre-impact differential capacitance measurement of the metal antenna and the adjacent metal sections prior to sensing a second acceleration indicating impact.

After the sensed impact, the processor can compare the stored differential capacitance from the initial calibrated differential capacitance measured the factory with a post impact differential capacitance measurement. Alternatively, where a pre-impact differential capacitance measurement was taken, the processor may compare the pre-impact differential capacitance measurements with the post impact differential capacitance measurements. In either case, the processor determines whether a change in differential capacitance has occurred between any of the metal antenna segment or the adjacent metal segments. If a change a capacitive has occurred, embodiments can calculate or use a lookup table from the memory 106 a corrective capacitance and/or inductance that is then provided to the antenna matching circuit 112 by the processor 108 in order to reach tune the antenna. In various embodiments this entire process can occur in less than a couple seconds such that a deformed antenna can be retuned to a proper impedance match by the antenna matching circuit 112 before the user can reach down and pick up dropped UE mobile communication device 100. This can be important because the UE retunes the deformed antenna prior to the user's hand getting close to the UE's antennas thereby affecting the impedance of the antennas.

The user can pick up the UE mobile communication device 100 and immediately request that the UE perform a wireless communication function and the antenna will already be retuned by the antenna match circuit 112 so that the antenna tuner 110 can properly impedance match the transceiver 116 with the metal band antenna 102 for the frequency band of being used.

Other sensor circuits when 18 may also be incorporated into the UE mobile communication device 100. These other sensors 118 are also connected to the processor for performing various functions.

Figure 4:
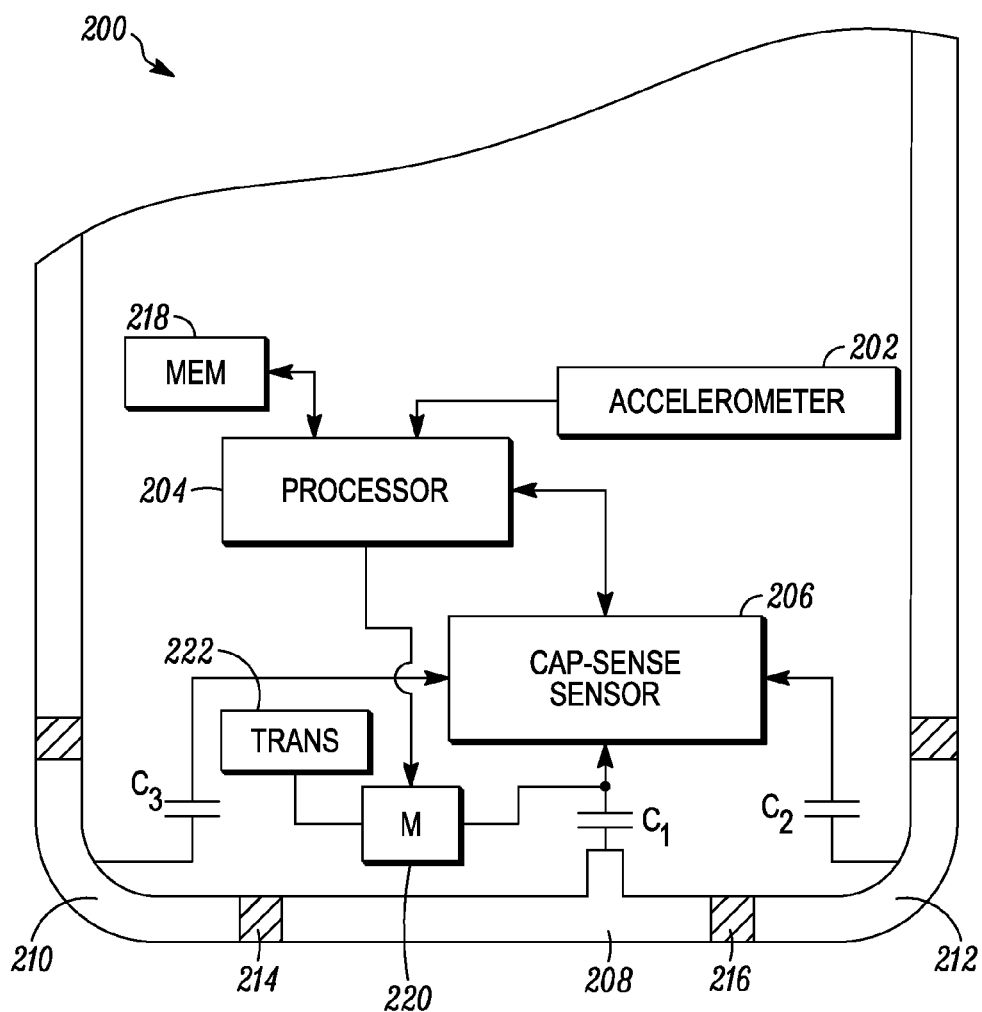
FIG. 4 is a block diagram of a cutaway portion of a mobile communication device that senses a potential deformed antenna.

FIG. 4 depicts a block diagram of a cut away portion of a UE 200 that senses a potential deformed antenna after receiving an accelerometer signal and retunes the antenna based on an impedance correction signal.

The accelerometer 202 measures an acceleration of the UE 200. The processor 204 monitors signals from the accelerometer 202. When the processor receives an accelerometer signal indicative of a rapid change in acceleration that exceeds a predetermined acceleration threshold and indicative of the UE experiencing an impact with a solid surface, the processor 204 then monitors the capacitance-sense circuit 206 to receive (1) a first differential capacitance between the antenna metal band section 208 and a first adjacent metal section 210 across decoupling capacitors C1 and C3; and (2) a second differential capacitance between the antenna metal band section 208 and the second adjacent metal band section 212 across decoupling capacitors C1 and C3. The first adjacent metal section 210 is isolated from the antenna section 208 by a nonconductive, insulative first gap material 214. Similarly, the second adjacent metal section 212 is isolated from the antenna section 208 by a nonconductive, insulative second gap material 216.

The processor 204, then compares the new first and second differential capacitance with a previously stored first and second differential capacitance from the memory 218. The processor determines whether the new first and second differential capacitance is different from the previously stored differential capacitance. When the new first or second differential capacitance is different from the corresponding previously stored first and second differential capacitance, then the processor provides an impedance correction signal to the impedance matching circuit 220 in order to adjust the impedance matching circuit 220 to compensate for the impedance difference and retune the first antenna to impedance match the transceiver 222 such that the antenna response is within the frequency band being used by the transceiver. The retuning of the antenna 208 via the impedance matching circuit 220 can be accomplished within 100 μsec to about 2 seconds of the processor sensing the accelerometer signal indicative of a rapid change in acceleration that exceeds a predetermined acceleration threshold and indicative of the UE being subjected to an impact with a solid surface.

Figure 5:
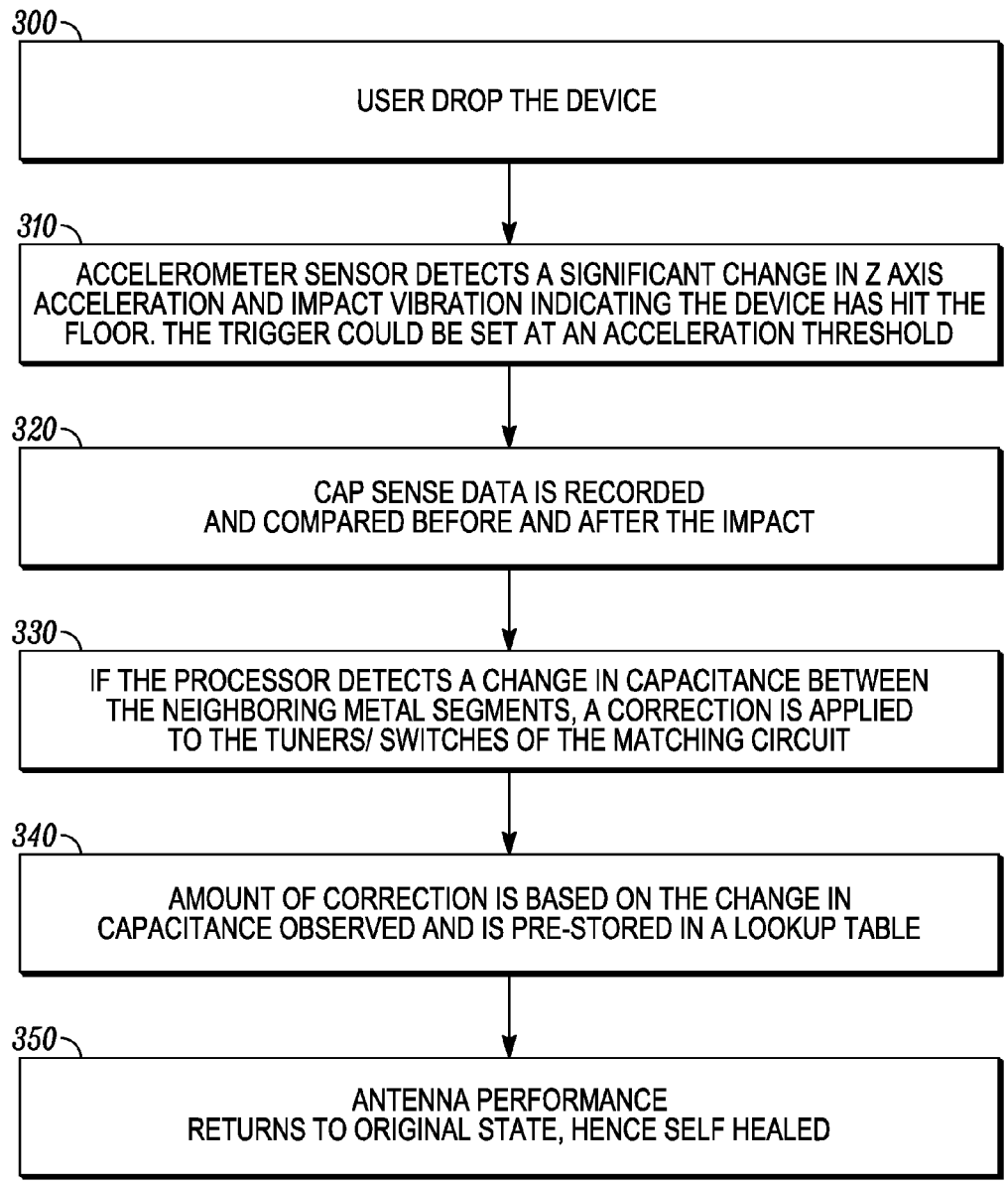
FIG. 5 is a flow chart depicting a method of self-healing an antenna in accordance with an embodiment.

Referring now to FIG. 5, a flow chart is shown depicting a method of self-healing an antenna on a mobile device. At step 300, a user is using a mobile communication device (UE) and fumbles or drops the device. Many scenarios can be imagined of how a UE device may be dropped. At step 310, an accelerometer sensor in the UE detects the initial acceleration of the UE being dropped in one or more axis (x, y and/or z axis) and a processor in the UE is configured to sense the initial acceleration. The sensing of the initial acceleration may set a flag to monitor for an upcoming larger second acceleration vector that is greater than a predetermined threshold and indicative of the UE impacting or hitting a hard surface in a manner hard enough to potentially deform and/or detune an antenna of the UE. The processor monitors the accelerometer output for a significant change in an acceleration vector comprising one or more of the x, y and z axis acceleration signals. A significant change in the accelerometer vector that is greater than a predetermined acceleration threshold can be interpreted by the processor as an indication that the UE has hit a hard surface such as the floor, sidewalk, street, steps, table top, etc. In some embodiments, the processor sets a drop trigger or drop flag when it receives a significant change in the accelerometer vector that is greater than the predetermined acceleration threshold.

When the drop flag is set due to the accelerometer vector being greater than the predetermined acceleration threshold, at step 310 the processor requests and receives a capacitive sensor signal from the capacitive sensor, which provides the new (post drop) differential capacitive measurements between the antenna and the first adjacent metal section, and the differential capacitance between the antenna and the second adjacent metal section. The processor retrieves a previously stored (pre-drop) differential capacitance between the antenna and the first adjacent metal section, and the antenna and the second adjacent metal section. The processor compares the new (post drop) differential capacitances with the previously stored (pre-drop) differential capacitances.

At step 330 and 340, when the processor detects a change in the capacitance between the new differential capacitances and the previously stored differential capacitances of the antenna with respect to the adjacent first or second metal sections, then the processor may provide an impedance correction signal to the antenna match circuit. When the differential capacitance between the antenna and the first or second adjacent metal sections has changed by at least a predetermined amount, then it is assumed that the antenna or one of the first or second adjacent sections was deformed due to the impact of the UE and the antenna needs to be retuned to impedance match the transceiver for the frequency band being transmitted or received.

The processor determines an amount of antenna impedance correction required based on the change in the differential capacitances from the previous to the new measurements. The processor uses a pre-stored look up table in the memory to retrieve and apply an impedance correction signal to the antenna matching and/or tuner circuit in order to adjust the antenna matching tuner/switches appropriately at step 340.

The antenna matching circuit adjusts its impedance as seen by the antenna the transceiver according to the received impedance correction signal such that, at step 350, the antenna impedance is retuned and the antenna performance returns to its original state prior to the phone being dropped.

In various embodiments, sensing of the UE being dropped, impacting a surface and retuning of a deformed antenna resulting from the UE impacting a surface is all accomplished in the short period of time between the user dropping the phone and the user picking the phone up. This can be important because when the user is holding a phone in his or her hand, the user's hand may add capacitance to the differential capacitance (or single ended capacitance) measured between the antenna section and the first and second adjacent metal sections. Thus, it can be advantageous to perform the post drop differential capacitance measurements as soon as possible after the processor determines that the UE has experienced a potential drop impact so that the differential capacitance measurements are more likely to accurately indicate whether or not the metal band antenna and/or a neighboring metal section has been deformed by the impact. Additionally, the user can pick up a dropped UE, notice that there is damage or deformation in the metal band about the edges of the phone, and still be able to use the phone without noticeable degradation to the transmission and reception of, for example, mobile telecommunication signals.

It should be noted that embodiments of this invention may heal or retune internal, external or metal band antennas that are deformed, moved, bent, displaced or otherwise detuned due to an impact of a UE against a hard surface.

It will be appreciated by those skilled in the art having the benefit of this disclosure that this self-healing antenna system provides a UE, which senses a dropped and/or impact condition of the UE resulting in a deformed and detuned the antenna. Then immediately after sensing the impact condition, can retune and re-impedance matches the antenna to its transceiver circuit such that little to no degradation in antenna performance or efficiency can be noticed. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the scope hereof, as defined by the following claims. Thus, it is intended that the following claims be interpreted to embrace all such further modifications, changes, rearrangements, substitutions, alternatives, design choices, and embodiments.

What is claimed is:

1. A user equipment (UE) comprising:
an antenna being impedance tuned to a transceiver via an impedance matching circuit;
a first metal section spaced by a first gap from a first end of the antenna;
a second metal section spaced by a second gap from a second end of the antenna;
an accelerometer configured to provide an acceleration signal;
a memory device configured to store previous differential capacitance measurements between the antenna and the first and second metal sections;
a capacitance sensing circuit configured to measure differential capacitances between the antenna and the first and second metal sections, the capacitance sensing circuit further configured to output a differential capacitance signal comprising the measured differential capacitances; and
at least one processor configured to:
monitor the acceleration signal;
detect, from the acceleration signal, an acceleration change in at least one axis of acceleration that exceeds a predetermined acceleration threshold;
receive, from the capacitance sensing circuit, a new differential capacitance measurement after detection of the acceleration change that exceeds the predetermined threshold; and
determine whether the new differential capacitance measurement is different from one of the previous differential capacitance measurements; when there is a change between at least one of the new and the previous respective differential capacitance measurements, then the processor is further configured to provide an impedance correction signal to the impedance matching circuit to retune the first antenna.

2. The UE of claim 1, wherein the antenna, the first metal section, and the second metal section are incorporated into a slotted metal bezel about a periphery of the UE.

3. The UE of claim 1, wherein the first and second gap are comprised of a nonconductive material.

4. The UE of claim 1, wherein the acceleration signal provided by the accelerometer comprises at least one of x, y, and z axis acceleration information.

5. The UE of claim 1, wherein the processor is further configured to receive the new differential capacitance measurement immediately after detection of the acceleration change that exceeds the predetermined threshold.

6. The UE of claim 1, further comprising a first decoupling capacitor between the antenna and the capacitance sensing circuit, a second decoupling capacitor between the second metal section and the capacitance sensing circuit, and a third decoupling capacitor between the first metal section and the capacitance sensing circuit.

7. The UE of claim 1, wherein the first and the second metal sections are corner metal sections of a slotted metal bezel that extends about at least a portion of a periphery of the UE.

8. A method of retuning an antenna on a mobile communication device, the method comprising:
sensing, by an accelerometer, that a change in acceleration that exceeds a threshold acceleration has occurred;
measuring, by a capacitance sensing circuit, a first differential capacitance between an antenna and a first adjacent metal section that is spaced from and adjacent to a first end of the antenna;
comparing, by a processor, the first measured differential capacitance between the antenna and the first adjacent metal section with a previously measured first differential capacitance value;
determining whether the first measured differential capacitance and the previously measured first differential capacitance value differ by greater than a first predetermined amount;
when the first measured differential capacitance and the previously measured first differential capacitance value differ by greater than the first predetermined amount, then providing by the processor a first selected impedance correction signal to an antenna matching circuit;
adjusting, by the antenna matching circuit in accordance with the selected impedance correction signal, an impedance between the antenna and a transceiver to retune the antenna impedance to the transceiver.

9. The method of claim 8, wherein comparing further comprises, retrieving from a memory device, by the processor, the previously measured first differential capacitance value.

10. The method of claim 9, further comprising storing the previously measured first differential capacitance value in the memory by the processor during the manufacturing process of the UE.

11. The method of claim 8, wherein sensing further comprises sensing a first acceleration indicative of the UE being dropped by a user and then immediately thereafter sensing for the change in acceleration that exceeds the threshold acceleration, wherein the threshold acceleration is of a magnitude indicative of the UE impacting a hard surface at a force hard enough to deform at least one of the antenna or the first metal section.

12. The method of claim 8, wherein measuring further comprises measuring, by the capacitance sensing circuit, a second differential capacitance between the antenna and a second adjacent metal section that is spaced from and adjacent to a second end of the antenna.

13. The method of claim 12, further comprising:
comparing, by the processor, the second measured differential capacitance between the antenna and the second adjacent metal section with a previously measured second differential capacitance value;
determining whether the second measured differential capacitance and the previously measured second differential capacitance value differ by greater than a second predetermined amount;
when the second measured differential capacitance and the previously measured second differential capacitance value differ by greater than the second predetermined amount, then providing by the processor a second selected impedance correction signal to the antenna matching circuit;
adjusting, by the antenna matching circuit in accordance with the second selected impedance correction signal, the impedance between the antenna and the transceiver to retune the antenna impedance to the transceiver.

14. A mobile communication device comprising:
a sectioned metal band about a periphery of the mobile communication device, the sectioned metal band comprising a plurality of metal sections separated by nonconductive gaps, wherein the plurality of metal sections comprises an antenna section, a first metal section adjacent to a first end of the antenna section, and a second metal section adjacent to a second end of the antenna section;

a transceiver circuit configured to transmit or receive communication signals;

an antenna matching circuit connected between the antenna and the transceiver, the antenna matching circuit configured to adjustably match an impedance between the antenna and the transceiver;

a capacitive sensor block configured to sense a first differential capacitance between the antenna and the first metal section and to sense a second differential capacitance between the antenna and the second metal section;

an accelerometer configured to sense an acceleration of the mobile communication device;

a processor configured to monitor the sensed acceleration of the mobile communication device, when the sensed acceleration of the mobile device is greater than a threshold acceleration indicative of the mobile communication device impacting a hard object hard enough to potentially deform the sectioned metal band, then the processor is further configured to:

immediately monitor the first differential capacitance and the second differential capacitance;

compare the first differential capacitance with a previously stored first differential capacitance to determine whether the first differential capacitance is different from the previously stored first differential capacitance by a first predetermined amount;

compare the second differential capacitance with a previously stored second differential capacitance to determine whether the second differential capacitance is different from the previously stored second differential capacitance by a second predetermined amount;

when either or both of the first and second differential capacitances differ by the first or second predetermined amount, respectively, then the processor is further configured to provide an impedance adjustment signal to the antenna matching circuit to adjust the impedance between the antenna and the transceiver to compensate for a detuning of the antenna due to the mobile communication device impacting the hard object.

15. The mobile communication device of claim 14, wherein the processor is further configured to locate data for the impedance adjustment signal in a look up table stored in a memory device within the mobile communication device.

* * * * *